(12) United States Patent
Song et al.

(10) Patent No.: US 12,340,116 B2
(45) Date of Patent: Jun. 24, 2025

(54) MEMORY SYSTEM ADAPTIVELY ALLOCATING A BUFFER MEMORY, MEMORY CONTROLLER AND METHOD OF OPERATING THE SAME

(71) Applicant: SK hynix Inc., Gyeonggi-do (KR)

(72) Inventors: Hae Lyong Song, Gyeonggi-do (KR); Woong Sik Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/466,831

(22) Filed: Sep. 14, 2023

(65) Prior Publication Data

US 2024/0361956 A1 Oct. 31, 2024

(30) Foreign Application Priority Data

Apr. 25, 2023 (KR) .................. 10-2023-0054108

(51) Int. Cl.
*G06F 3/06* (2006.01)
(52) U.S. Cl.
CPC .......... *G06F 3/0658* (2013.01); *G06F 3/0683* (2013.01); *G06F 3/0604* (2013.01)

(58) Field of Classification Search
CPC ....................................................... G06F 3/06
See application file for complete search history.

(56) References Cited

U.S. PATENT DOCUMENTS

| | | | |
|---|---|---|---|
| 8,949,555 B1* | 2/2015 | Karamcheti | G06F 13/1657 711/158 |
| 10,191,664 B2* | 1/2019 | Lee | G06F 3/0656 |
| 11,188,250 B2 | 11/2021 | Springberg et al. | |
| 2022/0413762 A1* | 12/2022 | Pletka | G06F 12/0844 |

FOREIGN PATENT DOCUMENTS

KR 10-2417977 B1 7/2022

* cited by examiner

*Primary Examiner* — Khoa D Doan
(74) *Attorney, Agent, or Firm* — IP & T GROUP LLP (57) ABSTRACT

A memory system may include a storage device, a buffer memory and a memory controller. The buffer memory may include a first portion and a second portion. The memory controller may detect a set event, store external data in the first portion before the event is detected, and store the external data in the second portion after the event is detected. The external data is associated with a read request or a write request from an external device.

20 Claims, 5 Drawing Sheets

MEMORY SYSTEM ADAPTIVELY ALLOCATING A BUFFER MEMORY, MEMORY CONTROLLER AND METHOD OF OPERATING THE SAME

CROSS-REFERENCES TO RELATED APPLICATION

The present application claims priority under 35 U.S.C. § 119 (a) to Korean application number 10-2023-0054108, filed on Apr. 25, 2023, which is incorporated herein by reference in its entirety.

BACKGROUND

1. Technical Field

Various embodiments of the present disclosure generally relate to a semiconductor integrated device, particularly, to a memory system adaptively allocating a buffer memory, a memory controller and a method of operating the same.

2. Related Art

A computer system may use a buffer memory for reducing a bottle neck caused by a difference in an operation speed between a data transmission device and a data reception device.

A memory system may perform data input/output operations using a volatile or non-volatile memory device in accordance with requests from an external device. For example, in order to prevent loss of data, the memory system may use the buffer memory to compensate for the difference in data transmission speeds between the data transmission device and the data reception device.

Therefore, it may be required to provide the memory system with the buffer memory having a bandwidth and a capacity which can secure optimal data transmission performance.

SUMMARY

According to example embodiments of the present disclosure, there may be provided a memory system. The memory system may include a storage device; a buffer memory including a first portion and a second portion; and a memory controller suitable for: detecting a set event, storing external data in the first portion before the event is detected, and storing the external data in the second portion after the event is detected, wherein the external data is associated with a read request or a write request from an external device.

According to example embodiments of the present disclosure, there may be provided a memory controller. The memory controller may include a first memory device; a second memory device; and a processor suitable for: detecting an event, which is triggered by at least one of an available space capacity of a storage device and an aging detection signal of the storage device, before the event is detected, storing, in the first memory device, external data read-requested or write-requested by an external device, and after the event is detected, storing, in the memory devices, the external data, which is transferred regardless of the read request or the write request from the external device.

According to example embodiments of the present disclosure, there may be provided a method of operating a memory system. The method of operating a memory system which includes a storage device and a memory controller controlling a buffer memory including a first portion and a second portion, may comprise detecting, by the memory controller, a set event; before the event is detected, storing, by the memory controller, in the first portion, external data, which is associated with a read request or a write request from an external device; and after the event is detected, storing, by the memory controller, the external data in the second portion.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
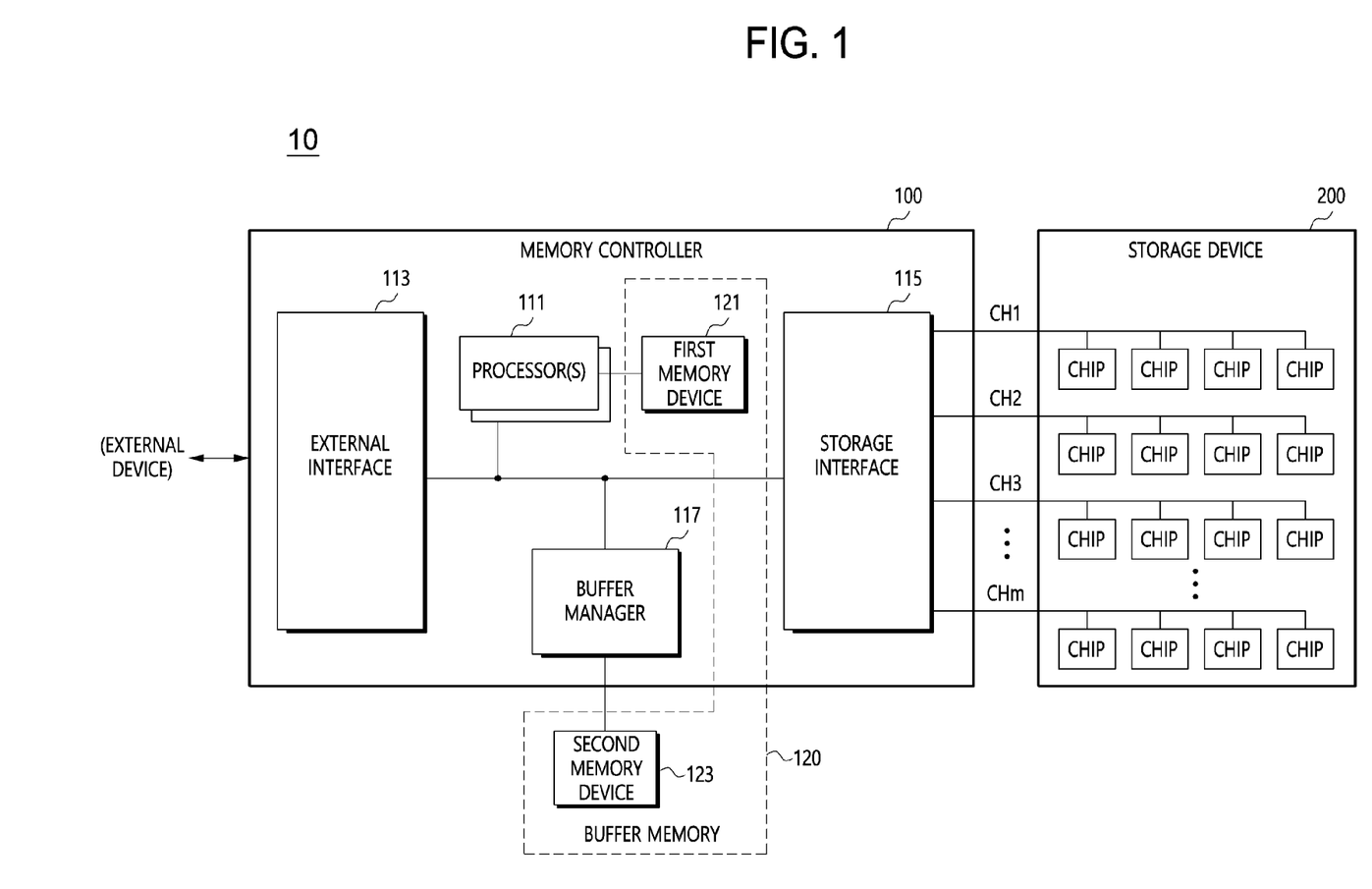
FIG. 1 is a diagram illustrating a memory system in accordance with example embodiments of the present disclosure.

FIG. 1 is a diagram illustrating a memory system 10 in accordance with example embodiments of the present disclosure.

Referring to FIG. 1, the memory system 10 may include a memory controller 100 and a storage device 200. The memory system 10 may be electrically connected with an external device to exchange data with the external device.

In some embodiments, the external device may include a personal computer, a laptop computer, a server computer, a work station, a tablet PC, a drone, an advanced drivers assistance system (ADAS), a smart TV, a smart phone, a medical device, an image display, a calibrator, an IoT, etc.

The storage device 200 may include at least one of a volatile memory device and a non-volatile memory device. The storage device 200 may be electrically connected with the memory controller 100 via a plurality of channels CH1~CHm. In the illustrated embodiments, the storage device 200 may include a plurality of memory chips CHIP. Alternatively, the storage device 200 may include a plurality of packages. Each memory chip CHIP may include a plurality of dies. Each of the dies may include at least one of a plurality of planes. Each of the planes may include at least one of a plurality of memory blocks. Each of the memory blocks may include a plurality of pages. A physical address may be allotted to a memory region of the storage device 200, for example, a page, a memory block and a die.

The memory controller 100 may control the storage device 200 in response to a request from the external device. For example, the memory controller 100 may program data in the storage device 200 in accordance with a write request from the external device. The memory controller 100 may read the data in the storage device 200 in response to a read request from the external device. The memory controller 100 may then provide the external device with the read data.

The memory controller 100 may include at least one of a plurality of processors 111, an external interface 113, a storage interface 115, a buffer manager 117, a first memory device 121 and a second memory device 123. The first memory device 121 and the second memory device 123 may be implemented with a buffer memory.

The processor 111 may include a combination of a hardware and firmware (FW) or a software operated on the hardware. The hardware may be operated by performing the firmware or the software for operating the memory system 10. In example embodiments, the processor 111 may include a flash transition layer (FTL) for managing the storage device 200, which is used to perform, for example, a garbage collection, an address mapping, a wear leveling, etc.

The external interface 113 may provide communication channels for receiving a command and a clock signal from the external device and controlling input/output of data in accordance with a control of the processor 111. The external interface 113 may provide a physical connection between the external device and the memory system 10.

The external interface 113 may temporarily store write data, which may be provided from the external device in accordance with the control of the processor 111, in one of the first memory device 121 and the second memory device 123. The external interface 113 may provide the external device with read data temporarily stored in the buffer memory 121 or 123.

In example embodiments, the external interface 113 may communicate with the external device based on a communication standard or interface using at least one of a USB protocol, a multimedia card protocol, PCI (peripheral component interconnection) protocol, PCI-e or PCIe (PCI-express) protocol, ATA (Advanced Technology Attachment) protocol, SATA (Serial-ATA) protocol, PATA (Parallel-ATA) protocol, SCSI (small computer small interface) protocol, ESDI (enhanced small disk interface) protocol, IDE (Integrated Drive Electronics) protocol, private protocol, SMBus (System Management Bus) protocol, I2C (Inter-Integrated Circuit) protocol, I3C (Improved Inter-Integrated Circuit) protocol, etc.

The storage interface 115 may provide communication channels between the memory controller 100 and the storage device 200. The storage interface 115 may register data, which may be temporarily stored in the buffer memory 121 or 123, in the storage device 200 in accordance with the control of the processor 111. The storage interface 115 may transmit the data read from the storage device 200 to the buffer memory 121 and 123. The read data may be temporarily stored in the buffer memory 121 or 123.

The buffer manager 117 may control the second memory device 123 in accordance with the control of the processor 111.

In the illustrated embodiment, the first memory device 121 may be positioned inside the memory controller 100, the second memory device 123 may be positioned outside the memory controller 100.

In example embodiments, the first memory device 121 may have an input/output bandwidth greater than an input/output bandwidth of the second memory device 123. The first memory device 121 may have an operation speed faster than that of the second memory device 123. The first memory device 121 may include a static random access memory (SRAM). The second memory device 123 may include a dynamic random access memory (DRAM). However, the characteristics of the first memory device 121 and the second memory device 123 may not be restricted within the above-mentioned characteristics.

The write data may be provided from the external device in accordance with the write request from the external device. The write data may be programmed in the storage device 200 by the control of the memory controller 100. The read data may be read from the storage device 200 by the control of the memory controller 100 in accordance with the read request of the external device. The read data may be provided to the external device. The write data and the read data may correspond to the external data.

Since a read operation, a write operation and an erase operation may be repeated, a storage space of the storage device 200 may be reduced and aged. In order to secure an available space of the storage device 200 or uniformly use blocks in the storage device 200, the memory controller 100 may perform storage management such as a garbage collection, a wear leveling, a read reclaim, etc. The storage management may be performed by an internal operation such as a background operation regardless of the request from the external device. Data transmitted and/or received between the memory controller 100 and the storage device 200 regardless of the read request or the write request from the external device by the background operation may correspond to the internal data.

The processor 111 may determine a work load pattern in accordance triggering of a set event. The processor 111 may arbitrate a buffering of the external data and the internal data in one of the buffer memories 121 and 123.

In example embodiments, the set event may be triggered based on at least one of an available space capacity of the storage device 200 and an aging detection signal. The available space may be an empty memory region, for example, a free block. The aging detection signal may represent an aging state of the memory system 10. When the storage management is required, the aging detection signal may be activated by the processor 111. Specific conditions and a method of triggering the set event will be described later.

Figure 2:
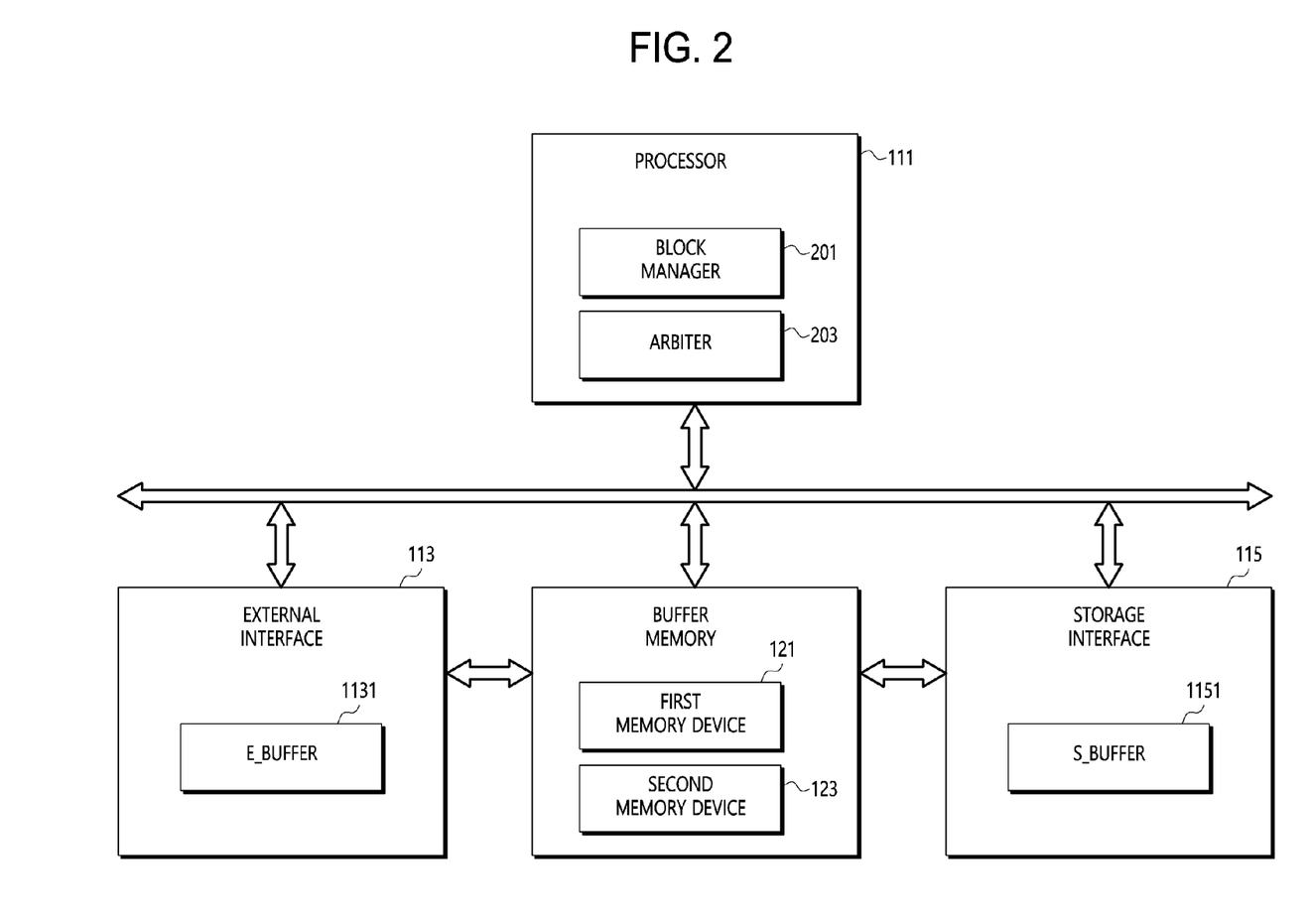
FIG. 2 is a diagram illustrating a data transmission concept in a memory system in accordance with example embodiments of the present disclosure.

FIG. 2 is a diagram illustrating a data transmission concept in a memory system in accordance with example embodiments of the present disclosure.

Referring to FIG. 2, the processor 111 may include a block manager 201 and an arbiter 203.

The external interface 113 may include an external interface buffer (E_BUFFER) 1131. The storage interface 115 may include a storage interface buffer (S_BUFFER) 1151.

The write data provided from the external device in accordance with the write request from the external device may be temporarily stored in the external interface buffer 1131. The write data may be transmitted to a specific portion of the buffer memory 121 and 123 allotted by the processor 111. The write data in the specific portion of the buffer memory 121 and 123 may be provided to the storage device 200 through the storage interface buffer 1151.

The read data provided from the external device in accordance with the read request from the external device may be temporarily stored in the storage interface buffer 1151. The read data may be transmitted to a specific portion of the buffer memory 121 and 123 allotted by the processor 111. The read data in the specific portion of the buffer memory 121 and 123 may be provided to the external device through the external interface buffer 1131.

The block manager 201 may mange state information of the memory blocks in the storage device 200. For example, the block manager 201 may mange the available space capacity, a wear volume, free block information, bad block information, etc.

The block manger 201 may trigger the set event based on the state information of the memory block.

In some embodiments, the block manager 201 may trigger the set event based on at least one of the available space capacity of the storage device 200 and the aging detection signal.

For example, the block manager 201 may calculate the available space capacity corresponding to a number of the free blocks. The block manager 201 may determine a requirement of the storage management based on the wear volume and/or the number of the free blocks. When the storage management is required, the block manager 201 may activate the aging detection signal.

The arbiter 203 may determine one of the first memory device 121 or the second memory device 123 as a position where the external data and/or the internal data is to be buffered in accordance with the triggering of the set event.

The block manger 201 may trigger the set event based on following conditions, not limited thereto.

First Condition: the available space capacity of the storage device is no more than a first threshold value Second Condition: a ratio of the available space capacity with respect to a total space of the storage device is no more than a second threshold value Third Condition: at least one of the first and second conditions is satisfied Fourth Condition: the aging detection signal is once activated Fifth Condition: the aging detection signal is activated by no less than a reference number being greater than 1

Sixth Condition: the third condition and the fourth condition are satisfied

Seventh Condition: the third condition and the fifth condition are satisfied

Before the set event is triggered, the arbiter 203 may control the external interface 113 to buffer the external data in the first memory device 121.

After the set event is triggered, the arbiter 203 may control the external interface 113 to buffer the external data in the second memory device 123. The arbiter 203 may control the storage interface 115 to buffer the internal data in the first memory device 121.

Before the set event is triggered, the internal data may be generated or not. For example, in the first condition, the second condition, the third condition, the fifth condition and the seventh condition, the internal data may be generated before the set event is triggered. The arbiter 203 may control the storage interface 115 to buffer the internal data in the second memory device 123.

In the fourth condition and the sixth condition, the internal data may not be generated before the set event is triggered. The buffering position of the internal data may be selectively selected from the first memory device 121 or the second memory device 123, not limited thereto.

The buffering position of the internal data before triggering the set event may not be limited. The buffering position of the internal data before triggering the set event may be determined, as at least one of the first memory device 121 and the second memory device 123, based on used states of the first memory device 121 or the second memory device 123, a size of the internal data, etc.

Figure 3:
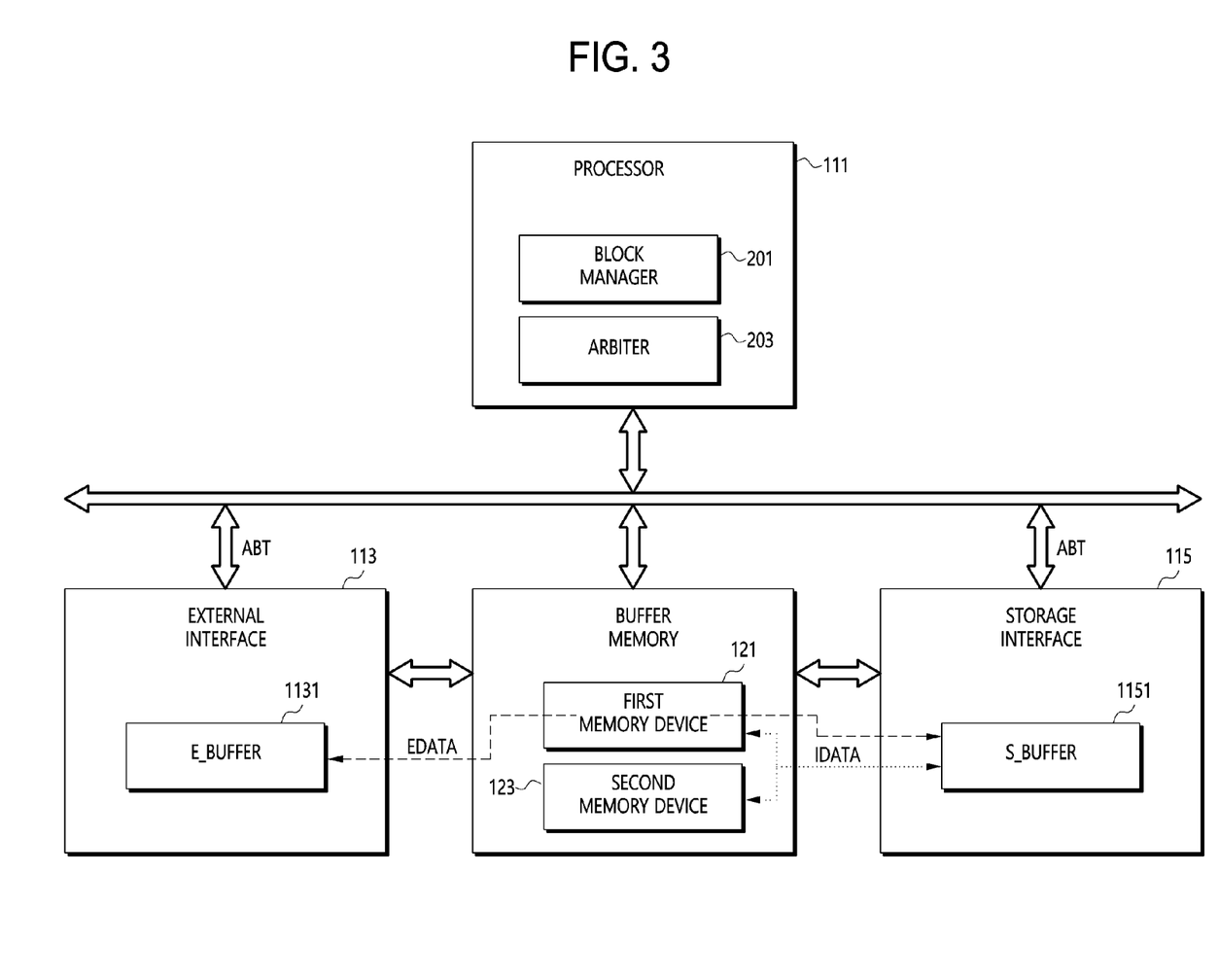
FIG. 3 is a diagram illustrating a buffer memory arbitration concept based on an event detection in accordance with example embodiments of the present disclosure.

FIG. 3 is a diagram illustrating a buffer memory arbitration concept based on an event detection in accordance with example embodiments of the present disclosure. In FIG. 3, transmission paths of the external data EDATA and the internal data IDATA in accordance with the control of the processor 111 are shown before the set event is triggered.

The external data EDATA may include the write data and the read data transferred in accordance with the request from the external device. The internal data IDATA may be transferred between the memory controller 100 and the storage device 200 regardless of the request from the external device.

When the set event is not triggered by the block manager 201, the arbiter 203 may transmit an arbitration signal ABT to the external interface 113 and the storage interface 115 to control the buffering position of the external data EDATA and the internal data IDATA.

The external interface 113 may store the external data EDATA, for example, the write data, in the first memory device 121 in response to the arbitration signal ABT.

The storage interface 115 may store the external data EDATA, for example, the read data, which has been stored in the storage interface buffer 1151, in the first memory device 121 in response to the arbitration signal ABT. The storage interface 115 may store the internal data IDATA, which has been stored in the storage interface buffer 1151, in the second memory device 123 in response to the arbitration signal ABT. The buffering position of the internal data IDATA may not be limited. The buffering position of the internal data IDATA may be determined, as at least one of the first memory device 121 and the second memory device 123, based on used states of the first memory device 121 or the second memory device 123, a size of the internal data, etc.

For example, the arbiter 203 may determine the buffering position of the internal data IDATA in accordance with at least one of the used states of the first memory device 121 or the second memory device 123 and the size of the internal data, and may then generate the arbitration signal ABT.

That is, before the set event is triggered, the arbiter 203 may control the external interface 113 and the storage interface 115 to buffer the external data EDATA in the first memory device 121.

Further, before the set event is triggered, the arbiter 203 may control the storage interface 115 to buffer the internal data IDATA in at least one of the first memory device 121 and the second memory device 123.

Figure 4:
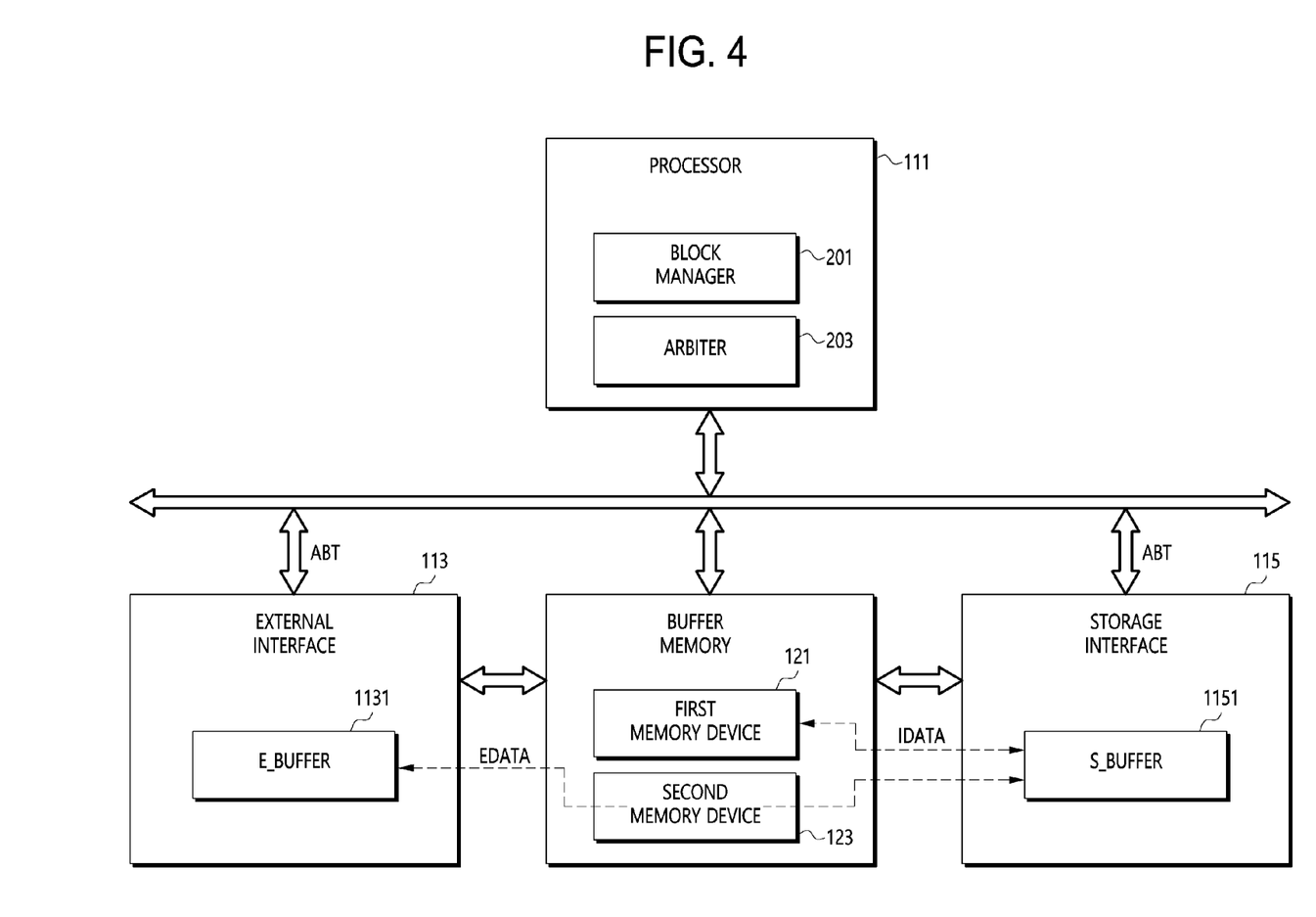
FIG. 4 is a diagram illustrating a buffer memory arbitration concept based on an event detection in accordance with example embodiments of the present disclosure.

FIG. 4 is a diagram illustrating a buffer memory arbitration concept based on an event detection in accordance with example embodiments of the present disclosure. In FIG. 4, transmission paths of the external data EDATA and the internal data IDATA in accordance with the control of the processor 111 are shown after the set event is triggered.

The external data EDATA may include the write data and the read data. The internal data IDATA may include data transmitted by the background operation.

After the set event is triggered by the block manager 201, the arbiter 203 may transmit the arbitration signal ABT to the external interface 113 and the storage interface 115 to control the buffering position of the external data EDATA and the internal data IDATA.

The external interface 113 may store the external data EDATA, for example, the write data, which has been stored in the external interface buffer 1131, in the second memory device 123 in response to the arbitration signal ABT. The storage interface 115 may store the internal data IDATA, which has been stored in the storage interface buffer 1151, in the first memory device 121 in response to the arbitration signal ABT.

That is, after the set event is triggered by the block manger 201, the arbiter 203 may control the external interface 113 and the storage interface 115 to buffer the external data EDATA in the second memory device 123 and the internal data IDATA in the first memory device 121.

Figure 5:
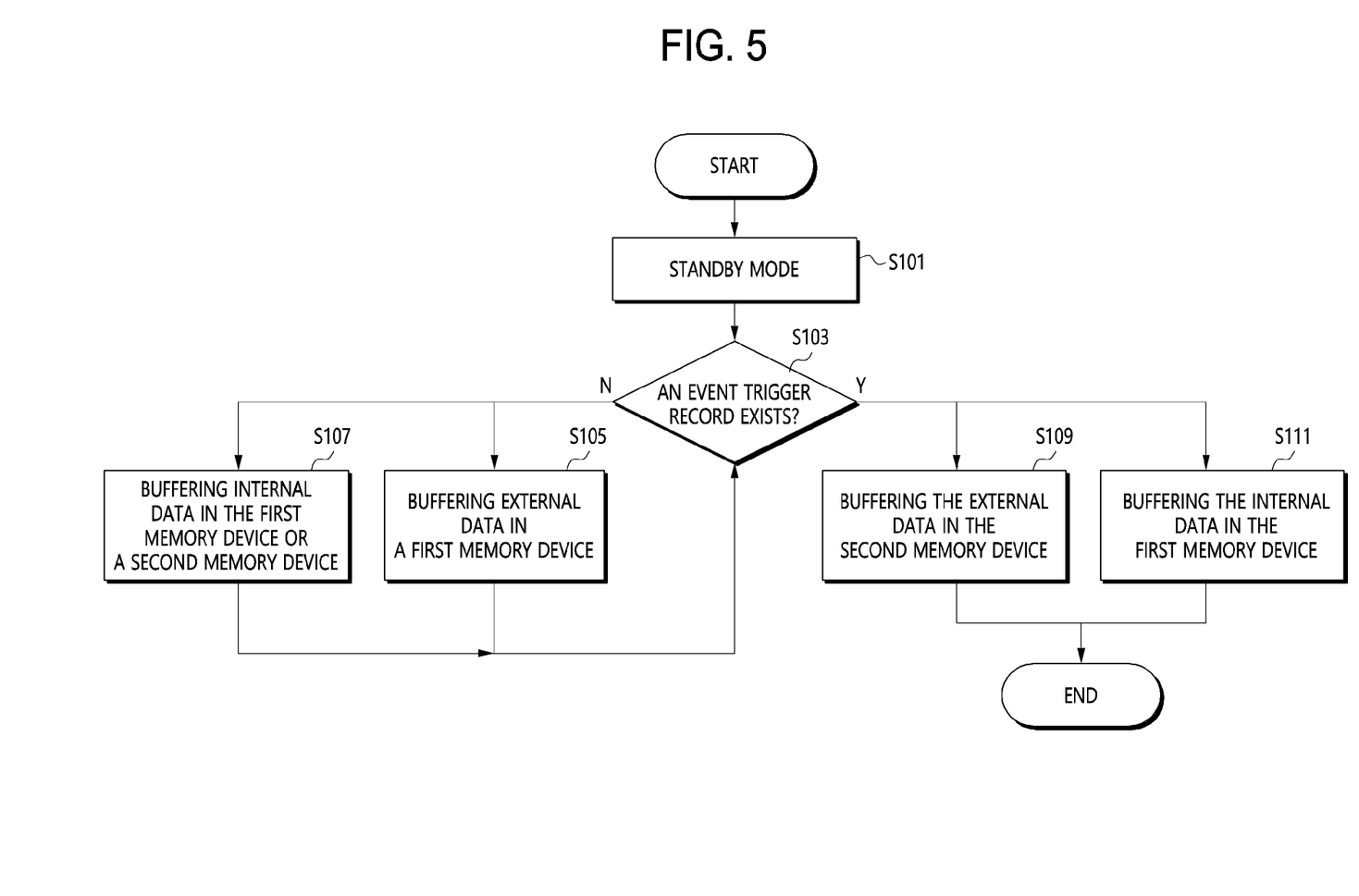
FIG. 5 is a flow chart illustrating a method of operating a memory system in accordance with example embodiments of the present disclosure.

FIG. 5 is a flow chart illustrating a method of operating a memory system in accordance with example embodiments of the present disclosure.

Referring to FIG. 5, in operation S101, the memory controller 100 of the memory system 10 may be in a standby mode.

In operation S103, the memory controller 100 may monitor whether the set event is triggered or not. In one aspect, the memory controller 100 may monitor a triggered record or history indicating whether the set event has ever been triggered.

In example embodiments, when any of the above-mentioned seven conditions is satisfied, the set event may be triggered based on at least one of the available space capacity of the storage device 200 and the aging detection signal.

Before the set event is triggered, i.e., the set event does not have a triggered record, in operation S105, the memory controller 100 may control the external interface 113 and the storage interface 115 to buffer the external data in the first portion of the buffer memory, for example, the first memory device 121. The memory controller 100 may continuously monitor the triggering of the set event.

Before the set event is triggered, i.e., the set event does not have a triggered record, in operation S107, the memory controller 100 may control the storage interface 115 to buffer the internal data in the first portion or the second portion of the buffer memory, for example, the first memory device 121 or the second memory device 123. The memory controller 100 may continuously monitor the triggering of the set event.

After the set event is triggered, i.e., the set event has a triggered record, in operation S109, the memory controller 100 may control the external interface 113 and the storage interface 115 to buffer the external data in the second portion of the buffer memory, for example, the second memory device 123.

After the set event is triggered, i.e., the set event does not have a triggered record, in operation S111, the memory controller 100 may control the storage interface 115 to buffer the internal data in the first portion of the buffer memory, for example, the first memory device 121.

In the memory system such as an SSD for a high performance server with larger capacity, sequential write operations may be mainly used at an initial stage of the memory system. After the memory system has entered into a sustain mode by repeatedly using the memory system, the work load pattern mainly including a random write operation may be represented.

Therefore, in order to improve the processing capacity of the external data, the first memory device, which has the bandwidth and the operation speed greater than those of the second memory device, may be used as the buffer memory for the external data in the initial stage where the internal data by the background operation is not generated.

After the memory system has entered into the sustain mode, the first memory device may be used as the buffer memory for the internal data and the second memory device may be used as the buffer memory for the external data, in order to guarantee the required capacity of the external device without increasing the expensive first memory device.

As a result, the buffer memory may be arbitrated in accordance with the work load pattern to secure the data processing capacity and to reduce a cost for securing the buffer memory.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications which are apparent in view of the present disclosure are intended to fall within the scope of the appended claims. Furthermore, the embodiments may be combined to form additional embodiments.

What is claimed is:

1. A memory system comprising:
    a storage device;
    a buffer memory including a first portion and a second portion; and
    a memory controller suitable for:
        detecting a set event,
        storing external data in the first portion before the event is detected, without storing the external data in the second portion, and
        storing the external data in the second portion after the event is detected, without storing the external data in the first portion, wherein the external data is associated with a read request or a write request from an external device.

2. The memory system of claim 1, wherein the first portion has a bandwidth greater than that of the second portion.

3. The memory system of claim 1, wherein the first portion is arranged inside the memory controller.

4. The memory system of claim 1, wherein the second portion is arranged outside the memory controller.

5. The memory system of claim 1, wherein the memory controller stores internal data in the first portion, wherein the internal data is transferred between the memory controller and the storage device regardless of the read request or the write request.

6. The memory system of claim 5, wherein the internal data comprises data associated with a background operation performed on the storage device.

7. The memory system of claim 1, wherein the event is triggered based on an available space capacity of the storage device.

8. The memory system of claim 1, wherein the event is triggered when a background operation performed on the storage device is activated.

9. A memory controller comprising:
a first memory device;
a second memory device; and
a processor suitable for:
   detecting an event, which is triggered by at least one of an available space capacity of a storage device and an aging detection signal of the storage device,
   before the event is detected, storing, in the first memory device, without storing in the second memory device, external data read-requested or write-requested by an external device, and
   after the event is detected, storing, in the first memory devices, without storing in the second memory device, internal data, which is transferred regardless of the read request or the write request from the external device.

10. The memory controller of claim 9, wherein the processor stores the external data in the second memory device after the event is detected.

11. The memory controller of claim 10, wherein the first memory device has a bandwidth greater than that of the second memory device.

12. The memory controller of claim 10, wherein the first memory device is arranged inside the memory controller.

13. The memory controller of claim 9, wherein the processor activates the aging detection signal when a background operation with respect to the storage device is required.

14. A method of operating a memory system which includes a storage device and a memory controller controlling a buffer memory including a first portion and a second portion, the method comprising:
   detecting, by the memory controller, a set event;
   before the event is detected, storing, by the memory controller, in the first portion, external data, which is associated with a read request or a write request from an external device, without storing the external data in the second portion; and
   after the event is detected, storing, by the memory controller, the external data in the second portion without storing the external data in the first portion.

15. The method of claim 14, further comprising: after the event is detected, storing, by the memory controller, in the first portion, internal data, which are transferred between the memory controller and the storage device regardless of the read request or the write request.

16. The method of claim 14, wherein the internal data comprises data associated with a background operation performed on the storage device by the memory controller.

17. The method of claim 14, wherein the event is triggered based on an available space capacity of the storage device.

18. The method of claim 14, wherein the event is triggered when a background operation performed on the storage device is activated.

19. The method of claim 14, wherein the first portion has a bandwidth greater than that of the second portion.

20. The method of claim 14, wherein the first portion is arranged inside the memory controller, and the second portion is arranged outside the memory controller.

* * * * *